United States Patent [19]
Hammett et al.

[11] Patent Number: 5,144,912
[45] Date of Patent: Sep. 8, 1992

[54] ANIMAL FEEDING DEVICE

[76] Inventors: Roy Hammett; Shirley A. Hammett, both of 16103 Carden Dr., Odessa, Fla. 33556

[21] Appl. No.: 787,140

[22] Filed: Nov. 4, 1991

[51] Int. Cl.⁵ .............................................. A01K 5/00
[52] U.S. Cl. ...................................... 119/61; 119/51.5
[58] Field of Search ............... 119/61, 63, 51.5, 51.01; 248/240, 240.1, 240.3

[56] References Cited

U.S. PATENT DOCUMENTS

| | | | |
|---|---|---|---|
| 2,555,396 | 6/1951 | Cosuer | 119/51.5 |
| 3,776,193 | 12/1973 | Post | 119/51.5 |
| 4,205,629 | 6/1980 | Wix | 119/61 |
| 4,699,089 | 10/1987 | Teschke | 119/61 |
| 4,798,170 | 1/1989 | De Piazzy | 119/61 |
| 4,953,506 | 9/1990 | Sanders | 119/61 |
| 4,976,223 | 12/1990 | Pierce | 119/61 |
| 5,000,124 | 3/1991 | Bergen | 119/63 |
| 5,054,431 | 10/1991 | Coviello | 119/61 |

Primary Examiner—John G. Weiss
Attorney, Agent, or Firm—Dennis H. Lambert

[57] ABSTRACT

An animal feeding device especially suitable for supporting food and water for household pets, comprises a support panel adapted to be secured at a desired elevation to a vertical surface such as a wall or the like, and a platform pivotably connected to the panel for supporting food receptacles or the like. The platform has a first, operative position oriented generally horizontally, and a second, stored position lying vertically closely adjacent the panel. Insect inhibiting structure is provided between the panel and the surface on which it is mounted to prevent crawling insects from reaching the platform and receptacles. The platform may be removed from the panel for cleaning or the like, and may be positioned at any desired elevation from the floor or other surface, improving its resistance to infestation by insects, and also placing it at a height convenient for the animal feeding from it.

21 Claims, 6 Drawing Sheets

FIG. 12

ANIMAL FEEDING DEVICE

FIELD OF THE INVENTION

This invention relates to animal feeding devices, and more particularly, to an apparatus for feeding household pets.

BACKGROUND OF THE INVENTION

Millions of people in the United States have pets, most commonly cats or dogs. In urban environments these animals are usually kept indoors, and rely upon their owners for food and water.

Most people simply use a dish or bowl placed on the floor or ground to feed and water their pets. This arrangement is not only susceptible to infestation by insects, but the feeding area also becomes quite easily soiled by spillage of food and water while the pet is eating and/or drinking.

Additionally, and particularly in the case of dogs, the size of the animals varies considerably. It is generally recognized that an animal's food and/or water should be placed at a height convenient for the animal, e.g., at a level that does not require the animal to assume an unnatural stance, with its head and neck stretched to a lowered position. Thus, while locating a feeding dish upon the floor or ground may be suitable for a small animal, it is generally regarded as unsatisfactory for larger animals, such as a German Shepard or Great Dane, for example.

Various efforts have been made in the prior art to provide solutions to the above problems. For instance, a number of pet feeding devices have been developed for supporting food and/or water at an elevated position convenient for the animal. Examples of such devices are disclosed in prior U.S. Pat. Nos. 2,845,896, 3,651,787, 4,044,723 and 4,065,195. All of these pet feeding devices are placed upon the floor or ground when in use, thus hindering cleaning of the area around the feeding device. This also makes such devices particularly susceptible to infestation by insects. Moreover, such conventional devices must be retrieved from their usual location and stored in a different place whenever it is desired or necessary to treat the area for insects and/or other pests, and the feeding device itself has no means for repelling or inhibiting insects.

Some animal feeding devices have been developed for preventing or reducing infestation of the animal's food by insects, and especially by crawling insects. Examples of such prior art devices are disclosed in U.S. Pat. Nos. 4,802,302 and 4,803,954. These devices consist of separable housing portions having an insecticide or insect inhibiting means placed between the separable housing portions. They are intended to be placed directly upon the floor or ground, or other supporting surface, and have no means for preventing inadvertant and undesireable movement of the receptacles while an animal is feeding from them.

Other food-holding supports of general interest are disclosed in U.S. Pat. Nos. 1,601,040, 2,574,250, 2,660,981 and 3,776,193. These devices do not contemplate any means for preventing infestation by insects, nor do they suggest placement at different elevations in order to optimize the feeding stance of a pet, or of means to immobilize the feeding device while the animal is eating or drinking.

SUMMARY OF THE INVENTION

Accordingly, it is an object of the present invention to provide a simple and inexpensive device for feeding and watering animals, especially household pets such as cats and dogs, in which means is provided to inhibit infestation by insects, and in which food and water receptacles are supported and immobilized at an elevation convenient for the particular animal using the device.

Another object of the invention is to provide a pet feeding device in which a receptacle or receptacles for food and/or water are supported from a wall surface in spaced relationship above an adjacent floor area, thus facilitating cleaning of the area around the pet feeding device.

A further object of the invention is to provide a pet feeding device that is supported from a wall surface, and which may be folded or collapsed to a stored position against the wall surface when not in use to make it unobtrusive and to facilitate cleaning and/or treatment of the area around the device.

Yet another object of the invention is to provide a pet feeding device that is adapted to hold a variety of differently sized, shaped and spaced food and/or water receptacles.

A still further object of the invention is to provide a pet feeding device that has a feeding platform pivotally interconnected with a splash panel, and in which the feeding platform may be easily disengaged from the splash panel for cleaning, etc.

These and other objects and advantages of the invention are achieved by a simple and economical structure that includes an upright splash panel having means to secure it to a vertical wall surface, and a generally horizontal feeding platform pivotally connected to the splash panel in spaced relationship above a floor.

Receptacles for food and/or water may be built-in or formed integrally with the feeding platform, or a variety of differently sized, shaped and spaced separate receptacles may be removably supported on the platform. The receptacles may be specially made for the device of the invention, or they may comprise conventional pet food dishes supported on the platform of the invention device.

The platform is pivotable to an upright, stored position alongside the splash panel, and may be disengaged from the splash panel for easy cleaning, etc. Further, detent means is provided between the platform and splash panel to prevent inadvertant upward displacement of the platform.

Insect inhibiting means is provided between the splash panel and wall surface to prevent infestation of the feeding area by insects, especially crawling insects.

BRIEF DESCRIPTION OF THE DRAWINGS

The foregoing objects and advantages of the invention will become apparent from the following detailed description when considered in conjunction with the accompanying drawings, in which like reference characters designate like parts throughout the several views, and wherein.

DETAILED DESCRIPTION OF THE PREFERRED EMBODIMENTS

Referring more particularly to the drawings, a first form of animal feeding device according to the invention is represented generally at 10 in FIGS. 1–4 and 12. In this form of the invention, the device comprises a splash panel 11 of generally rectangular configuration, adapted to be secured at any desired height on a vertical wall surface WS, and having pivot support means 12 and 13 at opposite lower edges thereof for pivotally supporting a feeding platform 14 in either a generally horizontal operative position or an upright stored position. Food and/or water receptacles 15 and 16 are provided in the feeding platform, and cooperating latch means 17 are provided on the splash panel and platform for holding the platform in its upright, stored position.

Insect inhibiting means 18 is provided in association with mounting studs 19, 20, 21 extending between the rear surface of the splash panel and the wall surface on which it is mounted for preventing or inhibiting insects from reaching the food and water receptacles on the platform.

Indicia holding means 22 may be provided on the front surface of the splash panel for holding a card or plaque or other suitable indicia 23 indicating the pet's name, pedigree, etc.

With particular reference to FIGS. 2–7, details of construction of the splash panel and feeding platform can be seen. The splash panel 11 has a substantially smooth front face 30 (With the indicia holding means 22 thereon), a rearwardly projecting peripheral wall 31, opposite side edges 32 and 33, a top edge 34 and a bottom edge 35.

Figure 3:
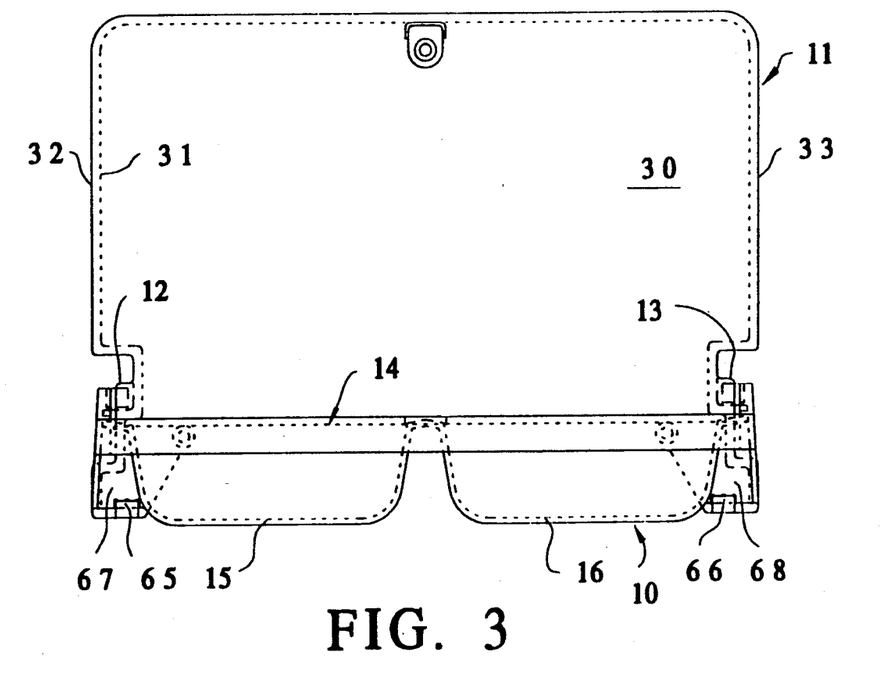
FIG. 3 is a front view of the device of FIG. 1.
Figure 4:
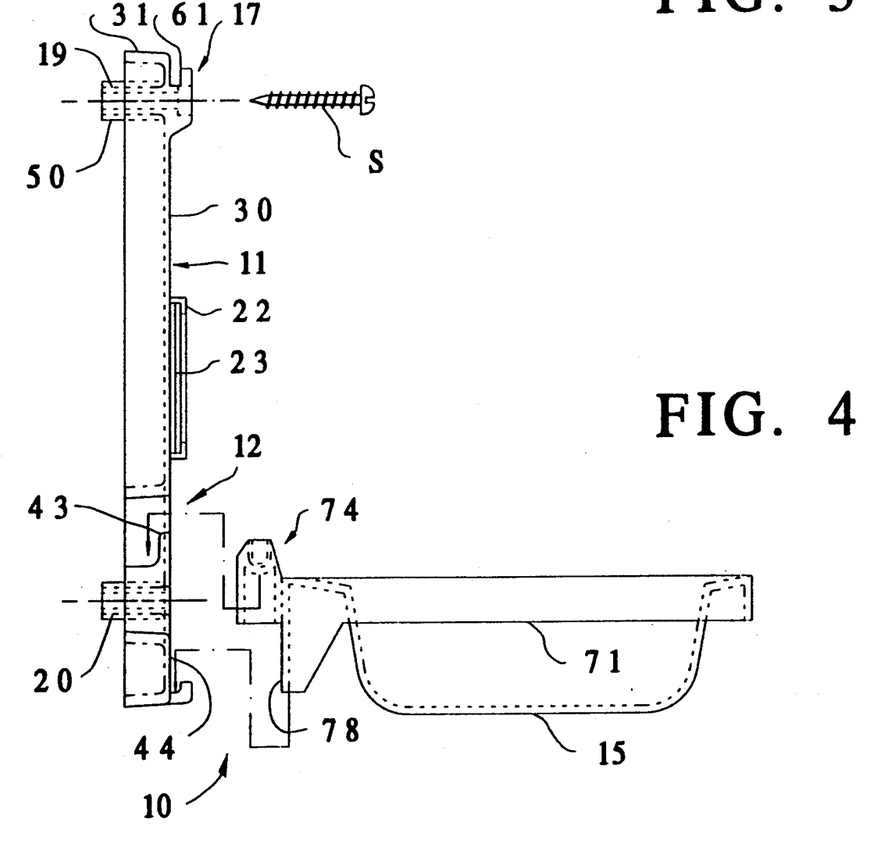
FIG. 4 is an exploded side or end view of the device of FIG. 1.
Figure 5:
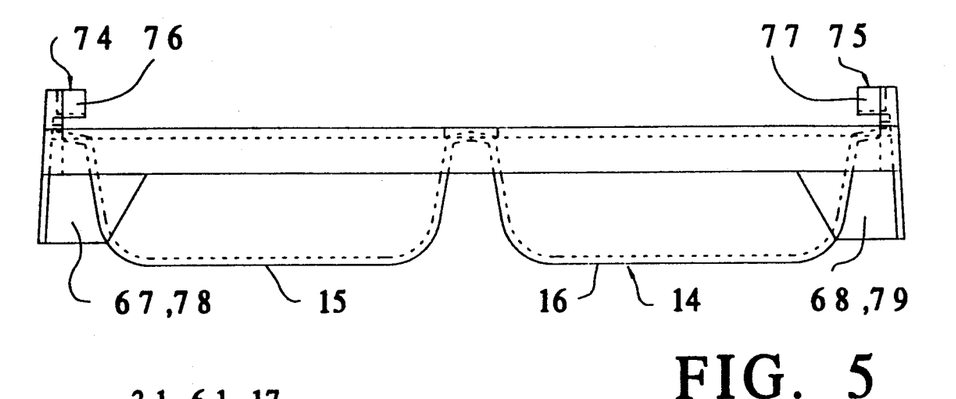
FIG. 5 is a front view of the feeding platform of the device of FIG. 1.
Figure 7:
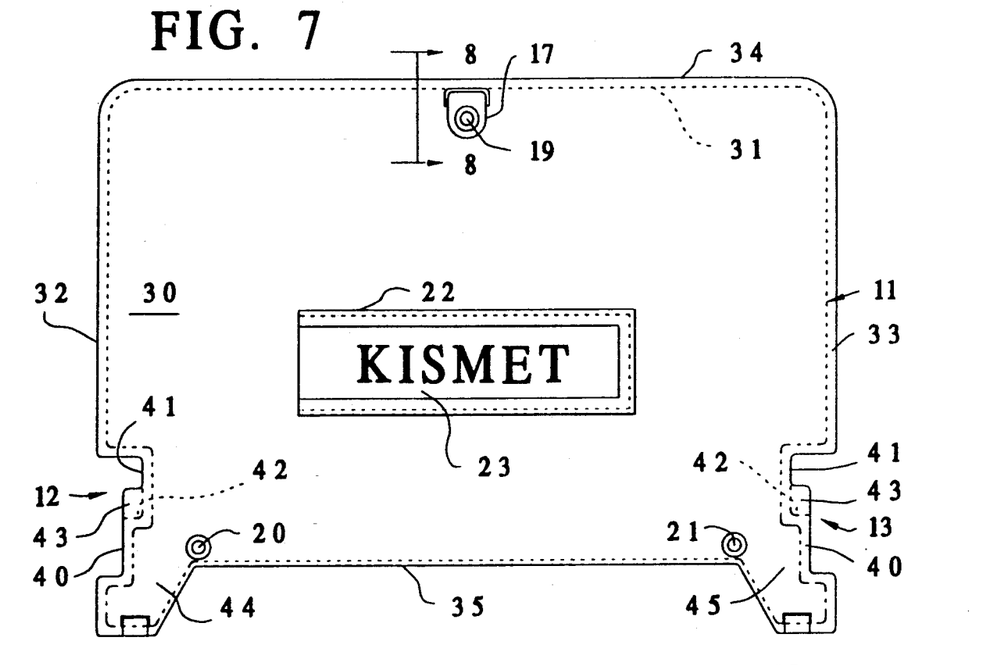
FIG. 7 is a front view of the splash panel of the device of FIG. 1.

As seen best in FIGS. 3 and 7, each of the side edges are recessed near the bottom of the splash panel to define a clearance space 40 and an assembly slot 41. The peripheral wall 31 is offset laterally inwardly relative to the side edges, below the assembly slot, to form a generally horizontal, upwardly facing support ledge 42. The front face of the splash panel continues upwardly beyond the support ledge to define a retaining wall 43, and the lower side edges thereof define a pair of stop surfaces or supports 44 and 45. These elements, i.e., the clearance space 40, assembly slot 41, support ledges 42 and support surfaces 44 and 45, define the pivot support means 12 and 13, as further described hereinafter.

Further details of the splash panel are more clearly shown in FIGS. 2, 4 and 7–10, wherein the insect inhibiting means 18 and latch means 17 are illustrated. As seen in these figures, the insect inhibiting means 18 comprises the plurality of mounting studs 19, 20 and 21 projecting rearwardly from the front wall and extending beyond the plane of the rearmost edge of the peripheral wall 31, so that when the splash panel is mounted on a wall surface, the splash panel is spaced from the wall, defining a gap G that is difficult for insects to cross. As seen best in FIG. 7, these mounting studs are arranged in a triangular pattern, with one located near a top center portion of the panel, and the others located near the pivot support means at the lower side edges of the panel. They thus function in the nature of a tripod when supporting the splash panel on a wall surface. In addition, an insecticide 50, which may include a sticky substance, is placed on the mounting studs to prevent insects from reaching the food receptacles by crawling along the studs.

Figure 8:
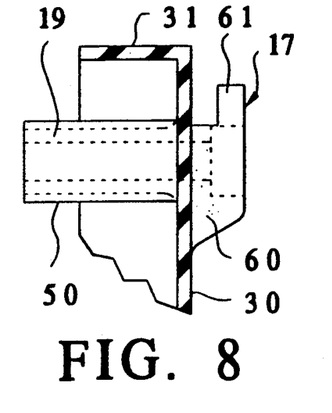
FIG. 8 is an enlarged, fragmentary view in section, taken along line 8—8 in FIG. 7, of the latch for holding the feeding platform in an upright, stored position.
Figure 9:
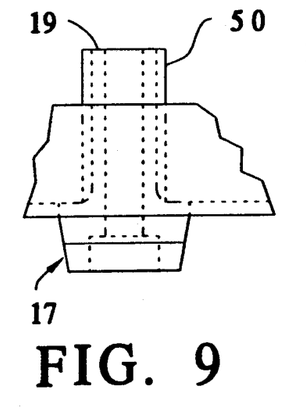
FIG. 9 is an enlarged, fragmentary top view of the latch of FIG. 8.
Figure 10:
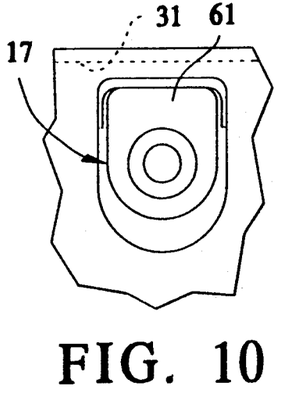
FIG. 10 is a fragmentary front view of the latch of FIG. 8.

The latch means 17 is formed as a part of the mounting stud 19 structure, and includes a forwardly directed protrusion 60 having an upturned hook flange 61 thereon. Fastening screws S are extended through this and the other two mounting studs and into a wall to attach the panel to the wall surface.

A pair of upturned, hook-shaped detent flanges 65 and 66 are formed on the lower front corners of the splash panel and cooperate with flanges 67, 68 on the bottom of the platform 14 to hold the platform in its horizontal, operative position. Thus, the platform cannot be accidentally pivoted upwardly about the pivot supports, and food or water in the receptacles 15 and 16 will not be spilled.

Figure 6:
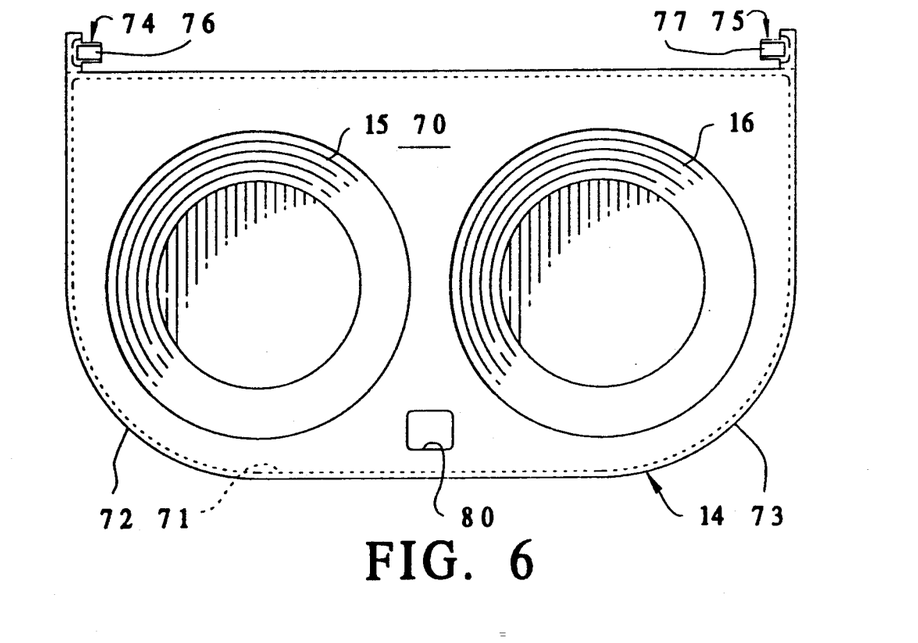
FIG. 6 is a top plan view of the feeding platform of FIG. 5.

Details of the feeding platform 14 are seen most clearly in FIGS. 2–6 and 12. With particular reference to FIG. 6, the platform can be seen as having a generally rectangular configuration in plan view, with the food and/or water receptacles 15 and 16 being substantially symmetrically positioned in the platform. The platform comprises a thin-walled member having a top surface 70 in which the two receptacles 15 and 16 are integrally formed as recessed portions, and includes a peripheral, downturned flange 71 which serves to reinforce the platform and make it more rigid, as well as make it more aesthetically pleasing. The front corners of the platform, at its opposite side edges, may be rounded at 72 and 73 to reduce the chance of accidentally bumping or kicking the platform when walking past it.

Opposite side edges of the platform have pivot structures 74 and 75 thereon for cooperation with the pivot support means on the splash panel to pivotally interconnect the platform and splash panel. These pivot structures 74 and 75 project both upwardly and rearwardly of the platform, and include laterally inwardly directed pivot arms 76 and 77 which are adapted to be received through the assembly slots 41 and to rest on the support ledges 42 at opposite sides of the splash panel, behind the retaining wall 43.

Figure 1:
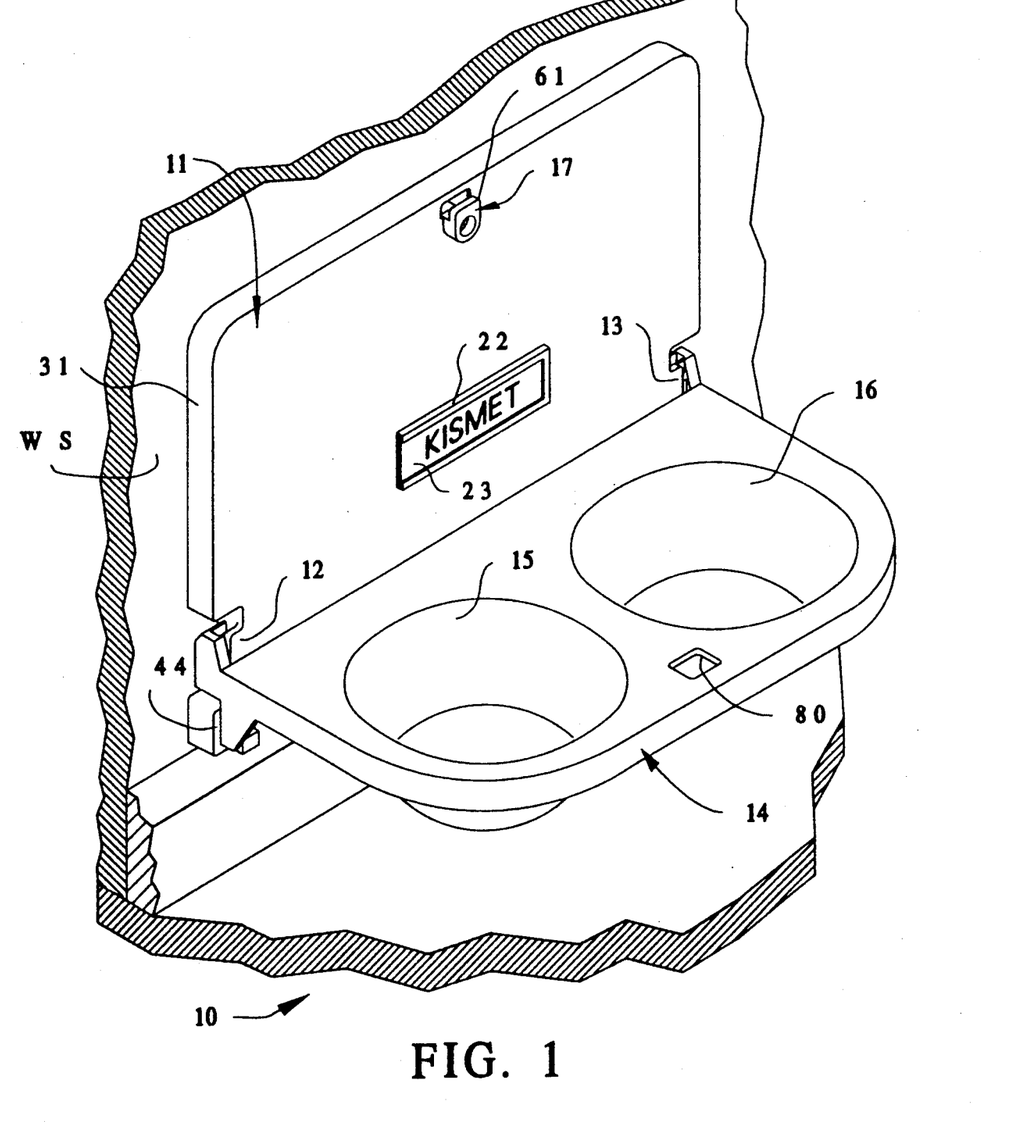
FIG. 1 is a front, top perspective view of a first form of pet feeding device of the invention.
Figure 2:
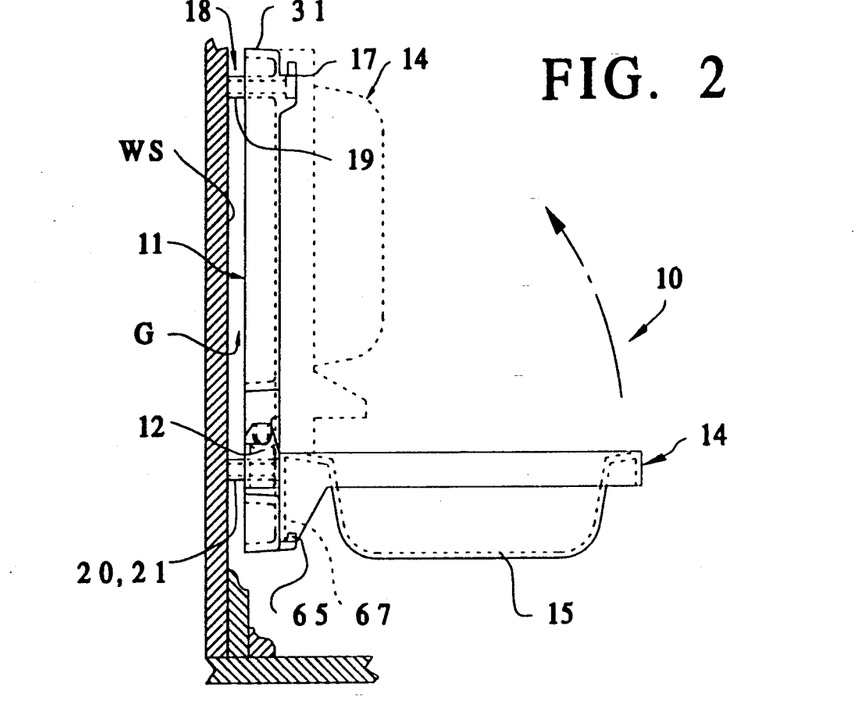
FIG. 2 is a side view of the device of FIG. 1, showing it attached to a wall surface, with the tray or feeding platform shown in operative position in full lines, and in folded or stored position in dot-and-dash lines.

Stop projections 78 and 79 extend downwardly from the opposite rear corners of the platform in positions to engage against the stop surfaces 44 and 45 on the splash panel to support the platform is in its operative, horizontal position as shown in FIGS. 1 and 2. These stop projections may comprise the same structure that defines the detent flanges 67 and 68 for cooperation with the latching detents 65 and 66.

A latch opening 80 is formed through the top surface 70 at a forward edge of the platform, between the two receptacles 15 and 16, for receiving the hook flange 61 when the platform is raised to an elevated position lying vertically against the splash panel, thereby holding the platform in its raised position.

Figure 11:
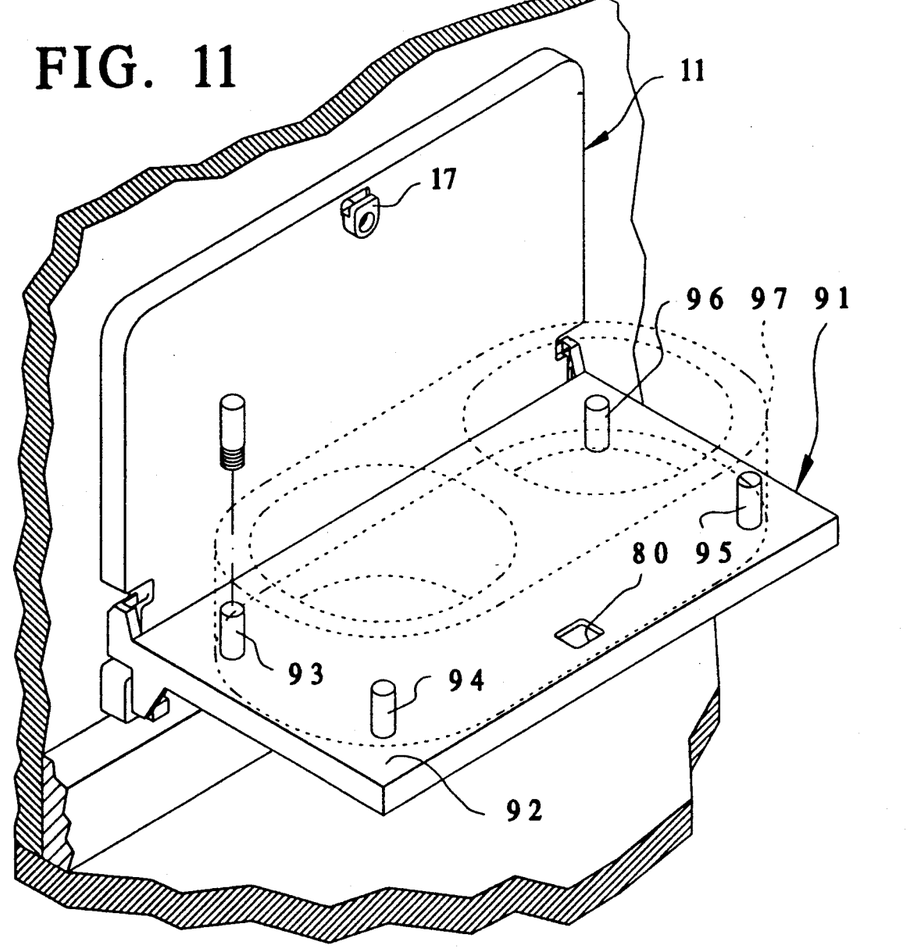
FIG. 11 is a front perspective, partially exploded view of a modified device adapted to support conventional pet feeding dishes.
Figure 12:
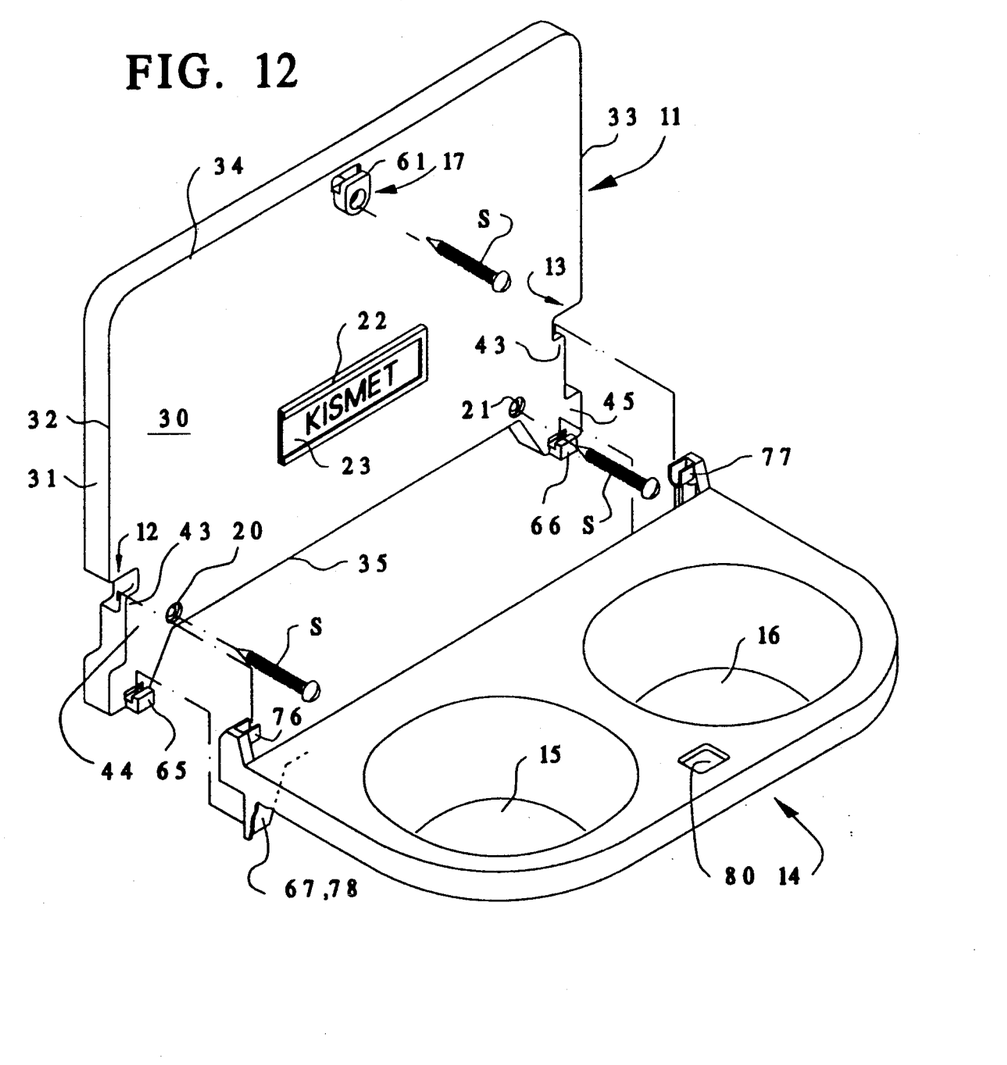
FIG. 12 is an exploded, front perspective view of the device of FIG. 1.

A modification of the invention is shown at 90 in FIG. 11. In this form of the invention, the splash panel 11 is constructed identically to that previously described, but the platform 91 is formed with an uninterrupted, flat top surface 92, rather than having the integrally formed recesses defining the food and water receptacles as in the first form of the invention. Suitable protrusions or detents 93, 94, 95 and 96 are provided on the top surface 92 for locating and immobilizing on the platform a food dish 97 of conventional, commercially available construction. These detents may comprise simple pegs that can be secured in place by the pet owner to conform to the size and shape of any desired food receptacle or receptacles, and may rely upon adhesive, screws, etc. for fastening them in position.

The feeding device of the invention is preferably made of injection molded or blow molded plastic, although it may be formed in any suitable way from any suitable material or materials. In one specific construction, the splash panel and platform each have an overall width of nine or ten inches, with the splash panel having a height of about seven inches. Each receptacle is about four inches in diameter, and one and three-quarter inches deep.

Further, rather than the integrally formed receptacles shown in FIGS. 1-10 and 12, or the conventional, commercially available receptacle of FIG. 11, the receptacles may comprise separate bowls or dishes that are received in complemental holes or cut-outs in the platform. The receptacles may also have shapes other than circular, as shown in the drawings. For instance, they may be rectangular, or any other shape desired.

The smooth front surface of the splash panel, and the smooth upper surface of the platform make the device easy to clean. Moreover, the platform may be easily removed from the splash panel simply by lifting the pivot arms from behind the retaining walls and slipping them forwardly through the assembly slots. The platform is reattached to the splash panel by reversing this process.

In use, the platform may be latched in its upper, stored position by pivoting it upwardly into a vertical orientation alongside the splash panel, and then lifting it slightly to align the hook flange with the latch opening. In this connection, the pivot support means has vertical clearance to enable such vertical movement between the platform and the panel.

While the invention has been illustrated and described in detail herein, it should be understood that other variations and modifications of the invention can be made without departing from the scope of the invention as defined by the claims appended hereto, and such other variations and modifications are intended to be covered hereby.

What is claimed is:

1. An animal feeding device, comprising:
   a splash panel adapted to be mounted at a selected elevation upon a vertical surface so as to lie generally parallel to the vertical surface;
   a food supporting platform pivotally connected to the splash panel for operative support from the splash panel in a generally horizontal position in spaced relationship above a floor or other surface, said platform being pivotable upwardly into a stored position lying closely adjacent and generally parallel to the splash panel; and
   receptacle means on said platform for holding food and/or water for an animal.

2. An animal feeding device as claimed in claim 1 wherein:
   insect inhibiting means is provided between said splash panel and said vertical surface to prevent crawling insects from reaching the splash panel, platform and receptacle means thereon.

3. An animal feeding device as claimed in claim 2, wherein:
   said splash panel is generally rectangular in shape, having a substantially flat, smooth front surface and a rear peripheral edge; and
   mounting means extends rearwardly from said panel beyond said rear peripheral edge toward a vertical surface on which the panel is to be mounted, whereby when said panel is mounted on a vertical surface, said mounting means maintains said panel rear peripheral edge in spaced relationship to said vertical surface.

4. An animal feeding device as claimed in claim 3, wherein:
   said insect inhibiting means is on said mounting means, forming a barrier to passage of crawling insects along said mounting means to said panel.

5. An animal feeding device as claimed in claim 4, wherein:
   latch means is provided on said panel and said platform to hold them adjacent one another when the platform is in its upward, stored position alongside the panel.

6. An animal feeding device as claimed in claim 4, wherein:
   said mounting means comprises a plurality of elongate posts extending rearwardly from the panel, and fastening means adapted to extend through the posts and into a vertical surface to secure the panel to the surface.

7. An animal feeding device as claimed in claim 1, wherein:
   said splash panel is generally rectangular in shape, having a substantially smooth, flat front surface;
   said platform is generally rectangular in shape, having a substantially smooth, flat upper surface; and
   said platform is pivotally connected to said panel by pivot connecting means comprising pivot support means at opposite lower corners of the panel, and pivot structures at opposite rear corners of the panel for complemental engagement with the pivot support means on the panel.

8. An animal feeding device as claimed in claim 7, wherein:
   said pivot support means and said pivot structures are configured so that they may be selectively disengaged from one another for removing said platform from said panel for cleaning or other purposes.

9. An animal feeding device as claimed in claim 8, wherein:
   said pivot connecting means has clearance spaces for limited lateral movement of said platform and panel relative to one another; and
   said latch means comprises a projecting hook means on one of said panel and said platform, and opening means on the other of said panel and said platform for receiving said hook means to latch said platform to said panel, said limited lateral movement of said platform and panel relative to one another enabling said hook means and opening means to be aligned with one another and then shifted to engage said latch means.

10. An animal feeding device as claimed in claim 7, wherein:

said panel and platform have complemental, interengageable stop means thereon for supporting said platform in a generally horizontal, operative position for feeding animals.

11. An animal feeding device as claimed in claim 10, wherein:

insect inhibiting means is provided between said splash panel and said vertical surface to prevent crawling insects from reaching the splash panel, platform and receptacle means thereon.

12. An animal feeding device as claimed in claim 11, wherein:

mounting means extends rearwardly from said panel toward a vertical surface on which the panel is to be mounted, whereby when said panel is mounted on a vertical surface, said mounting means maintains said panel in spaced relationship to said vertical surface.

13. An animal feeding device as claimed in claim 12, wherein:

said insect inhibiting means is on said mounting means, forming a barrier to passage of crawling insects along said mounting means to said panel.

14. An animal feeding device as claimed in claim 13, wherein:

latch means is provided on said panel and said platform to hold them adjacent one another when the platform is in its upward, stored position alongside the panel.

15. An animal feeding device as claimed in claim 14, wherein:

said mounting means comprises a plurality of elongate posts extending rearwardly from the panel, and fastening means adapted to extend through the posts and into a vertical surface to secure the panel to the surface.

16. An animal feeding device as claimed in claim 15, wherein:

said pivot support means and said pivot structures are configured so that they may be selectively disengaged from one another for removing said platform from said panel for cleaning or other purposes.

17. An animal feeding device as claimed in claim 16, wherein:

said pivot connecting means has clearance spaces for limited lateral movement of said platform and panel relative to one another; and said latch means comprises a projecting hook means on one of said panel and said platform, and opening means on the other of said panel and said platform for receiving said hook means to latch said platform to said panel, said limited lateral movement of said platform and panel relative to one another enabling said hook means and opening means to be aligned with one another and then shifted to engage said latch means.

18. An animal feeding device as claimed in claim 17, wherein:

said panel and platform have complemental, interengageable stop means thereon for supporting said platform in a generally horizontal, operative position for feeding animals.

19. An animal feeding device as claimed in claim 1, wherein:

said panel and platform are made of a molded plastic material; and said receptacle means is integrally molded with said platform.

20. An animal feeding device as claimed in claim 1, wherein:

said receptacle means comprises separate receptacles for holding food and/or water, and said platform has holder means for supporting said receptacle means in position.

21. An animal feeding device as claimed in claim 20, wherein:

said holder means comprises a plurality of pegs that are secured to said platform in selected positions to engage and hold receptacle means of various configurations and sizes.

* * * * *